United States Patent [19]

Hori

[11] Patent Number: 5,552,985
[45] Date of Patent: Sep. 3, 1996

[54] CRUISING CONTROL APPARATUS

[75] Inventor: Eisaku Hori, Yokohama, Japan

[73] Assignee: Jidosha Kenki Kogyo Kabushiki Kaisha, Yokohama, Japan

[21] Appl. No.: 264,524

[22] Filed: Jun. 23, 1994

[30] Foreign Application Priority Data

Jun. 24, 1993 [JP] Japan .................................. 5-153650

[51] Int. Cl.⁶ .......................... B60K 31/04; G05D 13/58
[52] U.S. Cl. ............................... 364/426.04; 364/424.05; 180/170; 324/161
[58] Field of Search ......................... 364/426.04, 424.05, 364/431.07, 486; 180/170, 178, 179; 324/160, 161; 123/349, 350, 352

[56] References Cited

U.S. PATENT DOCUMENTS

| | | | |
|---|---|---|---|
| 4,797,826 | 1/1989 | Onogi et al. ...................... | 364/426.04 |
| 4,924,397 | 5/1990 | Kurihara et al. .................. | 364/426.04 |
| 5,040,121 | 8/1991 | Etoh et al. ........................ | 123/352 |
| 5,125,471 | 6/1992 | Iwaoka et al. ................... | 180/179 |
| 5,127,487 | 7/1992 | Yamamoto et al. ............... | 364/426.04 |
| 5,224,045 | 6/1993 | Stasell ............................... | 364/431.07 |

*Primary Examiner*—Vincent N. Trans
*Assistant Examiner*—Tan Q. Nguyen
*Attorney, Agent, or Firm*—Sughrue, Mion, Zinn, Macpeak & Seas

[57] ABSTRACT

A cruising control apparatus for a vehicle, which comprises a vehicle speed sensor, a command switch, a microcomputer for generating an actuator control signal and including a vehicle speed signal memory and a watch-dog signal generator for generating a pulse signal with a predetermined period, an actuator for driving a throttle valve, an actuator driving circuit for driving the actuator in response to the actuator control signal, a watch-dog signal detector for discriminating whether the pulse signal is normal or not, a prohibiting circuit for opening the actuator driving circuit when the pulse signal is abnormal, and the microcomputer further includes vehicle speed decision means for deciding the vehicle speed signal being higher than a predetermined upper limit signal or lower than a predetermined lower limit signal and means for maintaining the watch-dog signal generator in an OFF-state in response to the result of the vehicle speed decision means.

4 Claims, 2 Drawing Sheets

CRUISING CONTROL APPARATUS

BACKGROUND OF THE INVENTION

1. Field of the Invention

This invention relates to a cruising control apparatus which is used for running an automotive vehicle at a desirably preselected speed without operating an accelerator pedal by automatically controlling a throttle valve.

2. Description of the Prior Art

Heretofore, an apparatus with following function has been known a cruising control apparatus for automatically running the automotive vehicle at the desirably preselected speed.

Namely, in the conventional cruising control apparatus, a set coast switch of a command switch is switched on by a driver's operation when the vehicle speed attains desired speed between the predetermined minimum and maximum speeds suitable for the automatic constant speed cruising while the vehicle is travelling, thereby producing a cruise command signal, and the vehicle speed signal of the present vehicle speed generated from the vehicle speed sensor at the time of switching off the set coast switch is stored in a vehicle speed signal storage means according to the off-operation of the set coast switch. After this, a deviation between the vehicle speed signal generated from the vehicle speed sensor and the memory vehicle speed signal stored in the vehicle speed signal storage means and an acceleration obtained from a change rate of the vehicle speed signal generated from the vehicle speed sensor within a definite period of time are computed successively, and an actuator is actuated by being supplied with an electric current through an actuator switching means so that the present vehicle speed may correspond to the memory vehicle speed, thereby opening or closing a throttle valve of an engine of the automotive vehicle.

A microcomputer in the cruising control apparatus is always monitored by a watch dog signal discriminating means connected to a watch dog signal output means which is so designed as to generate always a pulse signal with a period predetermined according to a program of the microcomputer. If the pulse signal from the watch dog signal output means stops unexpectedly during the constant speed cruising control, the watch dog signal discriminating means discriminates that the microcomputer malfunctions, and makes the actuator switching means in an OFF-state by actuating a prohibiting means so that the actuator may not actuate the throttle valve infallibly in a case of malfunction of the microcomputer.

In the conventional cruising control apparatus, the actuator is controlled so as to be made in the non-working state by the watch dog signal discriminating means through the actuator switching means when the pulse signal from the watch dog signal output means discontinues as mentioned above, and the watch dog signal output means generates the pulse signal always even when the present vehicle speed is lower than the lower limit or higher than the upper limit of the automatic cruising control.

Therefore, there is a problem in that it is not always safe absolutely from the view point of controlling the actuator, and it is desired to overcome this problem.

SUMMARY OF THE INVENTION

This invention is made in view of the aforementioned problem of the prior art. It is an object to provide a cruising control apparatus which is possible to further improve the safety in the control of the actuator as compared with the conventional type.

The construction of the cruising control apparatus according to this invention for attaining the above-mentioned object is characterized by comprising a vehicle speed sensor for generating a vehicle speed signal proportional to a present speed of a vehicle; a command switch for generating a cruise command signal; a microcomputer for generating an actuator control signal and including a vehicle speed signal storage means for storing the vehicle speed signal supplied from the vehicle speed sensor in response to the cruise command signal from the command switch and watch-dog signal generating means for generating a watch dog signal with a predetermined period; an actuator for driving a throttle valve of the vehicle in the opening or closing direction; an actuator driving circuit connected between the microcomputer and the actuator for receiving the actuator control signal and for driving the actuator; a watch-dog signal discriminating means for discriminating the watch dog signal from the watch-dog signal generating means of the microcomputer whether the signal is in normal condition or not and for generating a prohibiting signal in case the signal is in abnormal condition; a prohibiting means connected between the actuator driving circuit and the watch-dog signal discriminating means for prohibiting the operation of the actuator driving circuit in response to the prohibiting signal supplied from the watch-dog signal discriminating means; and the microcomputer further including a first vehicle speed decision means for deciding the vehicle speed signal being higher than a predetermined first limit signal and means for maintaining the watch-dog signal generating means in an OFF-state in response to the result of the first vehicle speed decision means. Furthermore, the microcomputer of the cruising control apparatus may further include a second vehicle speed decision means for deciding the vehicle speed signal being lower than a predetermined second limit signal, the second limit signal being lower than the first limit signal, and means for maintaining the watch-dog signal generating means in an OFF-state in response to the result of the second vehicle speed decision means according to demand.

In the cruising control apparatus according to this invention, in a case where the present vehicle speed is higher than the predetermined upper limit (vehicle speed corresponding to the first limit signal) or lower than the predetermined lower limit (vehicle speed corresponding to the second limit signal), the watch dog signal generating means is maintained in a state in which the pulse signal is not output, whereby the discrimination is done by the watch dog signal discriminating means that the pulse signal of the watch dog signal generating means discontinues (abnormal), the actuator driving circuit is made into the OFF-state and the working of the actuator is forbidden. Consequently, dangerousness of the miss-working of the actuator is solved even if the microcomputer is broken by some rare accident while the automotive vehicle is travelling at the low or high speed and the error signal is generated from the broken microcomputer.

DESCRIPTION OF THE PREFERRED EMBODIMENT

Figure 1:
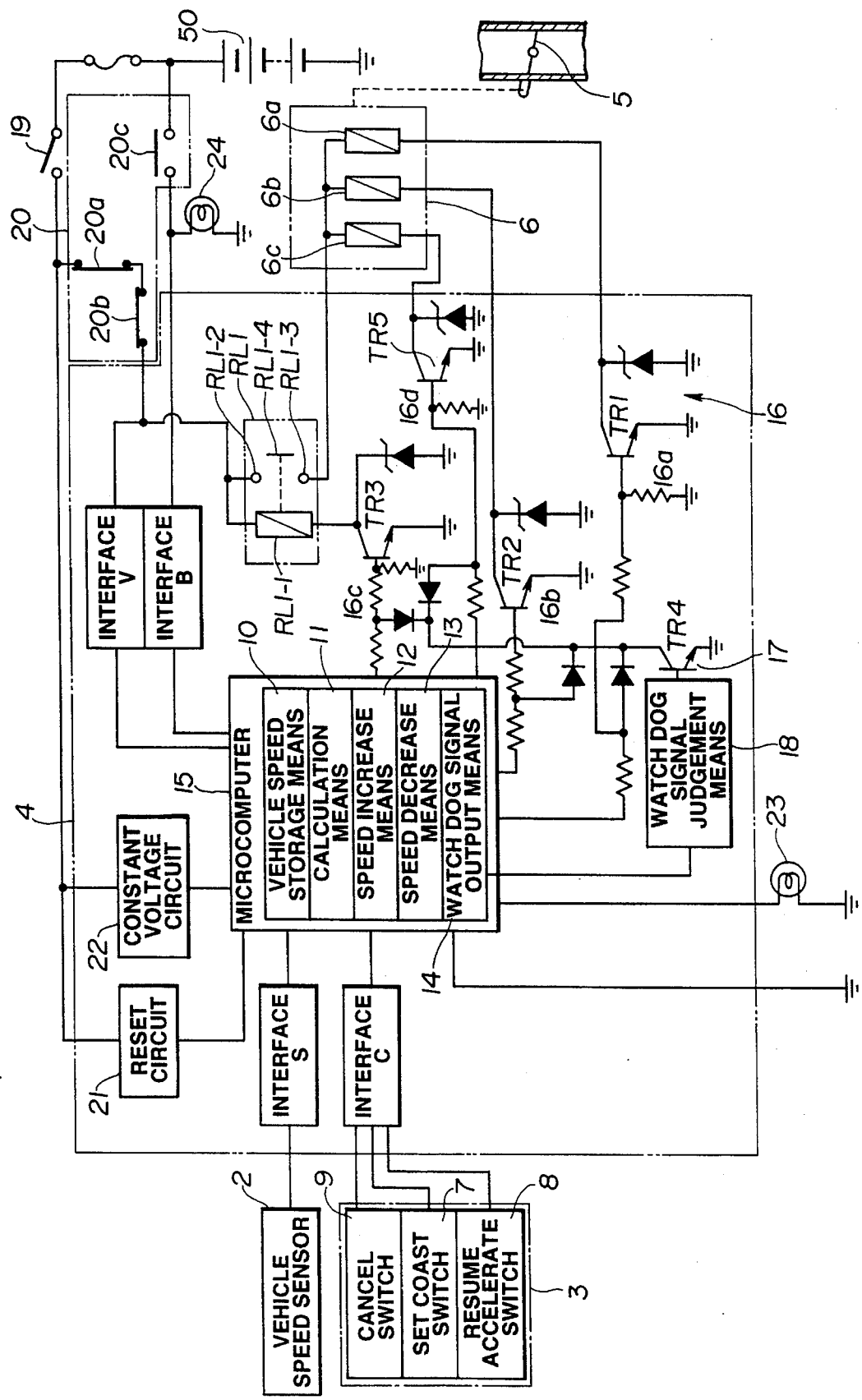
FIG. 1 is a circuit diagram illustrating an embodiment of the cruising control apparatus according to this invention.
Figure 2:
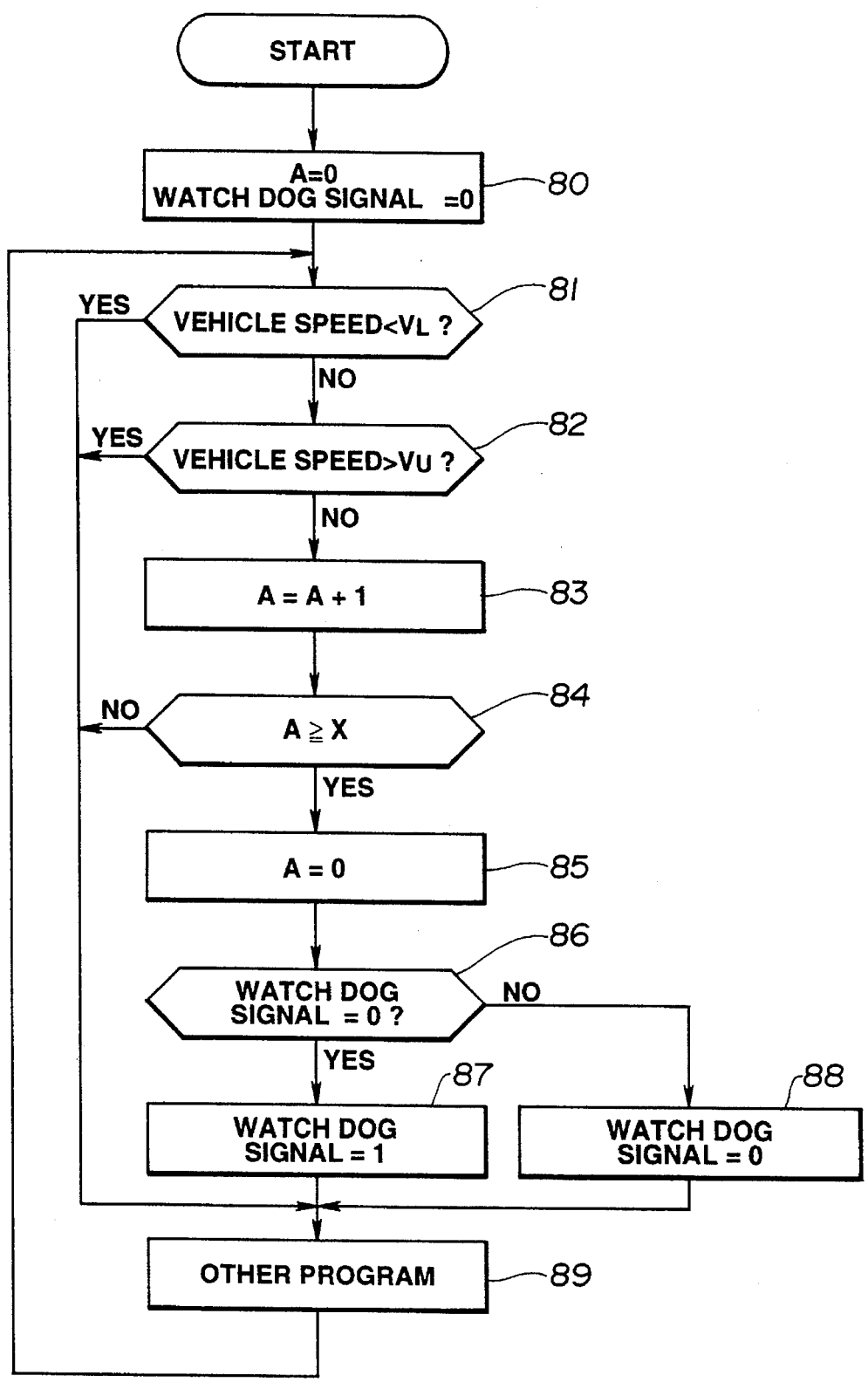
FIG. 2 is a flowchart illustrating the control for the watch dog signal for the cruising control apparatus shown in FIG. 1.

An embodiment of the cruising control apparatus according to this invention will be described in FIG. 1 and FIG. 2, FIG. 1 is a circuit diagram and FIG. 2 is a flowchart for illustrating a control operation for a watch dog signal.

The cruising control apparatus 1 shown in FIG. 1 is composed mainly of a vehicle speed sensor 2, a command switch 3, a control unit 4, a cruise cancel switch 20, and an actuator 6 connected to a throttle valve 5 of the vehicle on the output side.

A main switch 19 is connected on the lower side of a ignition switch (not shown), and supplies electric power to a microcomputer 15 in the control unit 4 through a constant voltage circuit 22 by the on-operation.

The vehicle speed sensor 2 is housed in a speedometer and always generates a vehicle speed signal in proportion to the present vehicle speed as a pulse signal while the automotive vehicle is travelling. The vehicle speed signal from the vehicle speed sensor 2 is transformed through an interface S provided in the control unit 4 and transferred to the microcomputer 15 in the control unit 4.

A set coast switch 7, a resume accelerate switch 8 and a cancel switch 9 forming the command switch 3 are returnable type switches attached on a steering wheel and are switched on by a driver's operation.

When the set coast switch 7 is switched on by the driver's operation while the automatic cruising control is cancelled, a cruise command signal is generated and transferred to the microcomputer 15 in the control unit 4 through an interface C provided in the control unit 4, and data of the vehicle speed signal from the vehicle speed sensor 2 are stored in a vehicle speed signal storage means 10 according to the off-operation of the set coast switch 7. Also, when the set coast switch 7 is switched off after the on-operation for a period of time longer than a predetermined time by the driver under the automatic cruising control, a coast command signal is generated corresponding to the amount of time the set coast switch 7 is kept in the on-operation for decreasing the vehicle speed and renewing the memory vehicle speed signal stored in the vehicle speed signal storage means 10, and when the set coast switch 7 is switched on and off repeatedly in a short period of time by the driver under the automatic cruising control, a tap-down command signal is generated for decreasing the vehicle speed gradually and renewing the memory vehicle speed signal in the vehicle speed signal storage means 10. The generated coast command signal and the tap-down command signal are transformed through the interface C in the control unit 4 and transferred to the microcomputer 15.

When the resume accelerate switch 8 is switched off after the on-operation for a period of time longer than a predetermined time by the driver under the automatic cruising control, an acceleration command signal is generated corresponding to the amount of time the switch 8 is kept in the on-operation for increasing the vehicle speed and renewing the memory vehicle speed signal, and a tap-up command signal is generated for increasing the vehicle speed gradually and renewing the memory vehicle speed signal when the resume accelerate switch 8 is switched on and off repeatedly in a short period of time according to the driver's operation under the automatic cruising control. Furthermore, when the resume accelerate switch 8 is switched on by the driver's operation while the automatic cruising control is cancelled, a resume command signal is generated for restoring the automotive vehicle into the constant speed cruising control at the last time before cancelling the automatic cruising control. The generated acceleration command signal, the tap-up command signal and the resume command signal are transformed through the interface C in the control unit 4 and transferred to the microcomputer 15.

The cruise cancel switch 20 is provided with a first brake switch 20c to be closed by operating a brake pedal, a second brake switch 20b to be opened by operating the brake pedal, and an inhibition switch 20a or a clutch switch to be opened according to an operation of an automatic transmission into a neutral range or a parking range, or an operation of a clutch pedal of a manual transmission.

A cancel switch 9 forming a part of cancelling elements generates a cancel command signal according to an on-operation by the driver under the automatic cruising control. The cancel command signal is also generated when the first brake switch 20c is switched on and the second brake switch 20b is switched off according to the operation of the brake pedal, the automatic transmission is operated into the neutral range or the parking range, the vehicle speed is reduced extremely, the clutch pedal of the manual transmission is operated, or the resume accelarete switch 8 and the set coast switch 7 are switched on at the same time. A brake lamp 24 lights by closing the first brake switch 20c.

The actuator 6 connected to the throttle valve 5 at on the output side thereof is provided with a vent valve 6a, a vacuum valve 6b and a safety valve 6c, which work by forming electric circuit for supplying an electric current to coils disposed to the respective valves 6a, 6b and 6c. The vent valve 6a and the safety valve 6c are released to the atmosphere on one side and communicate with a negative pressure chamber (not shown) provided in the actuator 6 on the other side. If a vacuum level in the negative pressure chamber becomes higher, the actuator 6 drives the throttle valve 5 in the opening direction against elasticity of a return spring (not shown), when the vacuum level in the negative pressure chamber becomes lower, the actuator 6 does not drive the throttle valve 5 but the throttle valve 5 is returned in the closing direction by the elastic restoring force of the return spring.

The vacuum valve 6b provided in the actuator 6 communicates with an intake manifold (negative pressure generating source) of the engine on one side thereof and communicates with the negative pressure chamber of the actuator 6 on the other side. Therefore, the vacuum valve 6b has a function for introducing the negative pressure generated by the engine into the negative pressure chamber when the valve 6b opens in the ON-state while the engine works. Additionally, if the vacuum valve 6b is replaced with a negative pressure generating motor, the negative pressure generating motor has a function for introducing the negative pressure into the negative pressure chamber.

The actuator 6 is so designed as to increase the negative pressure level in the negative pressure chamber by closing the vent valve 6a, the safely valve 6c and opening the vacuum valve 6b by making the respective valves into ON-states, and as to decrease the negative pressure level in the negative pressures chamber by opening the vent valve 6a, the safety valve 6c and closing the vacuum valve 6b by making the valves into OFF-states, respectively.

The control unit 4 is provided with the microcomputer 15, interfaces S, C, B and V, an actuator driving circuit 16, a relay RL1, a prohibiting means 17, a watch dog signal discriminating means 18, a reset circuit 21 and a constant voltage circuit 22. The actuator driving circuit 16 consists of a vent valve switching section 16a, a safety valve switching section 16d, a vacuum valve switching section 16b and an actuator power switching section 16c, and the bases of a transistor TR1 provided in the vent valve switching section 16a, TR2 provided in the vacuum valve switching section 16b, TR3 provided in the actuator power switching section 16c and TR4 provided in the safety valve switching section 16d are connected to the microcomputer 15.

The reset circuit 21 and the constant voltage circuit 22 are connected to the power source 50 on one side through a main switch 19 and connected to the microcomputer 15 on the other side, and set voltage by the constant voltage circuit 22 is impressed to the microcomputer 15 by switching on the main switch 19.

With respect to the relay RL1, one end of a relay coil RL1-1 is connected to one end of the brake switch 20b through a normal opened,fixed contact RL1-2, and the other end of the relay coil RL1-1 is connected to the collector of the transistor TR3 in the actuator power switching section 16c. Another normal opened-fixed contact RL1-3 of the relay RL1 is connected to ends of the coils of the vent valve 6a, the vacuum valve 6b and the safety valve tic of the actuator 6. When a voltage is applied to the transistor TR3 of the actuator power switching section 16c from the microcomputer 15, an electric circuit including the relay coil RL1-1 of the relay RL is formed and the relay coil RL1-1 is excited, whereby both the normal opened-fixed contacts RL1-2 and RL1-3 are connected through a movable contact RL1-4 and the voltage of tho power source 50 is applied on the other ends of the respective coils disposed to the safety valve 6c, the vent valve 6a and the vacuum valve 6b.

When the transistor TR4 in the actuator power switching section 16c is kept in the ON-state, the vacuum valve 6b becomes in the ON-state and is opened if the transistor TR2 provided in the vacuum valve switching section 16b is applied with a voltage from the microcomputer 15, the vent valve 6a becomes in the ON-state and is closed if the transistor TR1 provided in the vent valve switching section 16a is applied with a voltage from the microcomputer 15, and the safety valve 6c becomes in the ON-state and is closed if the transistor TR5 provided in the safety valve switching section 16d is applied with a voltage from the microcomputer 15.

When the cruise command signal is generated by switching off the set coast switch 7 after the on-operation while the automatic cruising control is cancelled, the vehicle speed signal storage means 10 provided in the microcomputer 15 stores the vehicle speed signal generated from the vehicle speed sensor 2 at the time of the off-operation in the predetermined speed setting range and generates a memory vehicle speed signal. When the coast command signal is generated by switching off the set coast switch 7 after the on-operation for a period of time longer than the predetermined time under the automatic cruising control, the memory vehicle speed signal stored in the vehicle speed signal storage means is renewed by the vehicle speed signal generated from the vehicle speed sensor 2 at the time of the off-operation. If it is recognized under the automatic cruising control that the set coast switch 7 generates the tap-down command signal, the memory vehicle speed signal is renewed with a signal obtained by subtracting a predetermined value from the vehicle speed signal (present vehicle speed) generated from the vehicle speed sensor 2 at the time of the on-operation of the set coast switch 7 at a calculation means 11 as described later, hereafter in a case which the generation of the tap-down command signal is recognized continuously, the memory vehicle speed signal is renewed with a signal obtained by subtracting the predetermined value from the memory vehicle speed signal stored in the vehicle speed signal storage means 10 at that time with every off-operation of the set coast switch 7 at the calculation means 11.

When the resume accelerate switch 8 is switched off after the on-operation for a period of time longer than the predetermined time under the automatic cruising control and the acceleration command signal is generated, the memory vehicle speed signal stored in the vehicle speed signal storage means 10 is renewed by the vehicle speed signal (present vehicle speed) generated from the vehicle speed sensor 2 at the time of the off-operation of the resume accelerate switch 8. When it is recognized under the automatic cruising control that the resume accelerate switch 8 generates the tap-up command signal, the memory vehicle speed signal is renewed with a signal obtained by adding a predetermined value to the vehicle speed signal generated from the vehicle speed sensor 2 at the time of the off-operation of the resume accelerate switch 8 at a calculation means 11, hereafter in a case of recognizing the generator of the tap-up command signal continuously, the memory vehicle speed signal is renewed with a signal obtained by adding the predetermined value to the memory vehicle speed signal stored at that time with every on-operation of the resume accelerate switch 8 at the calculation means 11.

When the cancel command signal is generated under the automatic cruising control from the cancelling elements such as the cancel switch 9, the brake switch 20c, 20b and so on, the vehicle speed signal storage means 10 keeps the memory vehicle speed signal, which is used as an objective vehicle speed for resuming the vehicle speed in response to the resume command signal generated while the automatic cruising control is cancelled.

The calculation means 11 provided in the microcomputer 15 executes predetermined calculation, that is a deviation between the memory vehicle speed signal stored in the vehicle speed signal storage means 10 and the vehicle speed signal presently generated by the vehicle speed sensor 2, and an acceleration obtained from a change rate of the vehicle speed signal generated from the vehicle speed sensor 2 within a definite period of time.

If the calculation result is negative value, a speed increase means 12 is actuated for a period of time corresponding to the calculation result, thereby generating an electric current for acceleration, when the calculation result is positive value, a speed decrease means 13 is actuated for a period of time corresponding to the calculation result, thereby generating an electric current for deceleration.

After the control unit 4 starts the control, a watch dog signal generating means 14 provided in the microcomputer 15 generates always a pulse signal with a predetermined period according to a program of the microcomputer 15, and the pulse signal generated from the watch-dog signal generating means 14 is transferred to a watch-dog signal discriminating means 18 and monitored by the watch-dog signal discriminating means 18.

On the other side, the watch-dog signal discriminating means 18 is provided with a prohibiting means 17, that is a transistor TR4 for prohibiting the operation of the actuator driving circuit 16 on the output side thereof, and the collector of the transistor TR4 is connected to bases of the transistor TR1 in the vent valve switching section 16a, the transistor TR2 in the vacuum valve switching section 16b, the transistor TR5 in the safety valve switching section 16d and the transistor TR3 in the actuator power switching section 16c through diodes, respectively. Therefore, OFF-states of the transistors TR1, TR2, TR3 and TR5 in the respective switching section 16a, 16b, 16c and 16d are secured by making the transistor TR4 as the prohibiting means 17 into the ON-state.

The watch-dog signal discriminating means 18 makes the transistor TR4 into the ON-state if the pulse signal is not generated from the watch dog signal generating means 14, or there is abnormality in the predetermined period of the pulse signal for example, according to trouble of the microcomputer 15.

The watch-dog signal generating means 14 is made into the OFF-state by first and second vehicle speed decision means and stops generating the pulse signal when the present vehicle speed obtained from the vehicle speed signal generated from the vehicle speed sensor 2 becomes lower than the predetermined lower limit (for example, 40 km/h), or higher than the predetermined upper limit (for example, 144 km/h). The watch dog signal discriminating means 18 makes transistor TR4 connected with the watch dog signal discriminating means 18 into the ON-state by detecting the stoppage of the pulse signal, thereby ensuring the OFF-state of the transistor TR1 in the vent valve switching section 16a, TR2 in the vacuum valve switching section 16b, TR5 in the safety valve switching section 16d and TR3 in the actuator power switching section 16c, and opening the electric circuit to the actuator 6.

In the cruising control apparatus 1 having the aforementioned structure, when the cruise command signal is generated by switching on the set coast switch 7 by the driver while the automatic cruising control is cancelled, the transistors TR1 and TR5 in the vent valve switching section 16a and the safety valve switching section 16d are made into ON-states at the same time the transistor TR3 in the actuator power switching section 16c is made into the ON-states in response to the cruise command signal, whereby the vent valve 6a and the safety valve 6c are closed and the negative pressure chamber of the actuator 6 is isolated from the external atmosphere. According to the off-operation of the set coast switch 7, the microcomputer 15 lights the cruise lamp 23, stores the vehicle speed signal generated at this moment from the vehicle speed sensor 2 in the vehicle speed signal storage means 10, and actuates the speed increase means 12 for an initialize set time. The transistor TR2 in the vacuum valve switching section 16b is made into the ON-state by being supplied with an electric current according to the actuation of the speed increase means 12, the vacuum valve 16b is opened for a period of time corresponding to the initialize set time, the negative pressure is introduced in the negative pressure chamber of the actuator 6, whereby the throttle valve 5 is driven in the opening direction as much as an amount corresponding to the initialize set time and the automatic constant speed cruising control is started.

In the automatic constant speed cruising control, the deviation between the memory vehicle speed signal stored in the vehicle speed signal storage means 10 and the present vehicle speed signal generated from the vehicle speed sensor 2, and the acceleration obtained from the change rate of the vehicle speed signal generated from the vehicle speed sensor 2 within the definite period of time are calculated according to the predetermined procedure. If the calculation result is a negative value, an accelerative electric current is supplied by actuating the speed increase means 12 for a period of time corresponding to the calculation results and the transistor TR2 in the vacuum valve switching section 16b is made into the ON-state. Accordingly, the vacuum valve 6b is opened for a period corresponding to the calculation results, the negative pressure is introduced into the negative pressure chamber and the control is executed so as to harmonize the vehicle speed signal with the memory vehicle speed signal stored in the vehicle speed signal storage means 10 by driving the throttle valve 5 as much as an amount corresponding to the calculation result in the opening direction.

When the calculation result is a positive value, a decelerative electric current is supplied by actuating the speed decrease means 13 for a period of time corresponding to the calculation result and the transistor TR1 in the vent valve switching section 16a is made into the OFF-state. Therefore, the vent valve 6c is opened for a period of time corresponding to the calculation result, the atmosphere is introduced into the negative pressure chamber of the actuator 6 and the control is carried out so as to harmonize the vehicle speed signal with the memory vehicle speed signal stored in the vehicle speed signal storage means 10 by driving the throttle valve 5 in the closing direction as much as an amount corresponding to the calculation result.

Explanation will be given about a pulse generating program shown in FIG. 2. The program starts by supplying power to the microcomputer 15, a watch dog signal inversion counter A is reset and the output of the watch dog signal is made into "0" at step 80.

At step 81, decision is done as to whether the present vehicle speed is lower than the predetermined lower limit $V_L$ or not, and decision is done at step 82 as to whether the present vehicle speed is higher than the predetermined upper limit $V_U$ in a case of deciding the present vehicle speed not to be lower than the lower limit $V_L$ (NO) at step 81.

In a case the decision is done at step 82 not to be higher than the upper limit $V_U$ (NO), the watch dog signal inversion counter A is incremented by "1" at step 83. Successively, decision is done as to whether or not the value of the watch dog signal inversion counter A is a predetermined value X or more at step 84.

In case the decision is done at step 84 that the value of the watch dog signal inversion counter A is smaller than the predetermined value X (NO), control returns to step 81 after executing the other program at step 89, namely the control loop is formed between steps 81 and 84 until the watch dog signal inversion counter A comes up to the predetermined value X.

When the decision is done at step 84 that the value of the watch dog signal inversion counter A is the predetermined value X or more (YES), the counter A is reset at step 85. Next, decision is done at step 86 as to whether the output of the watch dog signal is "0" or not.

In a case of deciding the output of the watch dog signal to be "0" (YES) at step 86, the output of the watch dog signal is made into "1" at step 87, namely the output of the watch dog signal is reversed, and the control returns to step 81 after executing the other program at step 89. If the decision is done at step 86 that the output of the watch dog signal is not "0" (NO), the output of the watch dog signal is made into "0" at step 88, namely the output of the watch dog signal is reversed, and the control returns to step 81 after executing the other program at step 89.

According to the repetition of such the control routine, the watch-dog signal generating means 14 always generates the pulse signal with the predetermined period. The watch-dog signal discriminating means 18 determines the microcomputer 15 to be normal so long as the pulse signal with the predetermined period is generated from the watch-dog signal generating means 14, and permits the transistors TR1, TR2, TR3, and TR5 in the respective switching sections 16a, 16b, 16c and 16d to be in ON-states by making the transistor TR4, that is the prohibiting means 17 in the OFF-state.

On the other side, in a case of deciding the present vehicle speed to be lower than the lower limit $V_L$ (YES) at step 81, the control returns to step 81 after executing the other program at step 89, namely the control loop is formed between steps 81 and 89, and steps 82 to 88 are skipped. Accordingly, the watch dog signal generating means does not execute the output inversion and does not generate the pulse signal.

If the decision is that the present vehicle speed is not lower than lower limit $V_L$ (NO) at step 81 and the present vehicle speed is higher than the upper limit $V_U$ (YES) at step 82, the control returns to step 81 after executing the other program at step 89, namely the control loop is formed between steps 82 and 89, and steps 83 to 88 are skipped. Accordingly, the watch dog signal generating means does not execute the output inversion and does not generate the pulse signal as mentioned above.

In the case where the pulse signal is not generated from the watch-dog signal generating means 14, that is the case where the decision is that the present vehicle speed is lower than the lower limit $V_L$ or higher than the upper limit $V_U$ at steps 81 and 82, the watch dog signal discriminating means 18 makes the transistor TR4 (prohibiting means 17)in the ON-state and maintains the transistors TR1, TR2, TR3 and TR5 in the respective switching sections 16a, 16b, 16c and 16d in the OFF-states.

Namely, because the transistor TR4 as the prohibiting means 17 is kept in the ON-state while the automotive vehicle is running at a speed lower than the lower limit (for example 40 km/h) by cancelling the automatic constant speed cruising control according to the brake operation or so, or running at a speed higher than the upper limit (for example 144 km/h), the transistors TR1 in the vent valve switching section 16a, TR2 in the vacuum valve switching section 16b, TR5 in the safety valve switching section 16d and TR3 in the actuator power switching section 16c are never switched on even if the microcomputer 15 malfunctions and, an erroneous signal is generated from the broken microcomputer 15 by some rare accident, so that the actuator 6 is prohibited to actuate the throttle valve 5 of the vehicle.

As mentioned above, in the cruising control according to this invention, the actuator is never supplied with an electric current in a case where the vehicle speed is lower than the predetermined lower limit or higher than the predetermined upper limit. Therefore, there is not a danger of working of the actuator even if an erroneous signal is generated by some rare accident of the microcomputer while the automotive vehicle is travelling at a low speed or high speed, and an excellent effect can be obtained in that it is possible to further improve the safety of the automatic constant speed cruising, especially in respect of the actuator control.

What is claimed is:

1. A constant-speed cruising controlling system for a vehicle having a throttle valve for controlling a speed thereof comprising:

a speed sensor for sensing an actual running speed of the vehicle and for generating a vehicle actual speed signal proportional to the actual running speed of the vehicle;

a command switch including a setting switch operable for generating a cruise command setting signal;

an actuator for driving the throttle valve of the vehicle;

an actuator driving circuit for driving said actuator;

a microcomputer connected with said speed sensor, said command switch and said actuator driving circuit, and having storage means, calculating means, controlling signal generating means and watchdog signal generating means, said storage means being adapted to store the vehicle actual speed signal generated by said speed sensor as a stored speed signal in response to operation of the setting switch of said command switch, said calculating means being connected to said storage means and to said controlling signal generating means and being adapted to compare said vehicle actual speed signal with the stored speed signal stored in the storage means for generating a differential signal corresponding to a difference between the stored speed signal and the vehicle actual speed signal, said controlling signal generating means being provided with a vehicle speed increasing signal generating means and a vehicle speed decreasing signal generating means for supplying vehicle speed increasing and decreasing signals to said actuator driving circuit, and said watchdog signal generating means being adapted to generate a watchdog pulse signal with a predetermined period during normal fault free operation of the microcomputer; and watchdog signal judgement means, connected with said microcomputer and said actuator driving circuits, adapted to monitor the watchdog pulse signal, said watchdog signal judgement means being adapted to prevent the operation of said actuator driving circuit in the event of an abnormality in the predetermined period of the watchdog pulse signal, wherein the improvement comprises;

said watchdog signal generating means of said microcomputer including monitoring means for monitoring the vehicle actual speed signal, said monitoring means being adapted to allow the generation of the watchdog pulse signal only when the value of the vehicle actual speed signal is in a range defined by predetermined lower and upper limiting values.

2. A constant-speed cruising controlling system for a vehicle having a throttle valve for controlling a speed thereof comprising:

a speed sensor for sensing an actual running speed of the vehicle and for generating a vehicle actual speed signal proportional to the actual running speed of the vehicle;

a command switch including a setting switch operable for generating a cruise command setting signal;

an actuator for driving the throttle valve of the vehicle;

an actuator driving circuit for driving said actuator;

a microcomputer connected with said speed sensor, said command switch and said actuator driving circuit, and having storage means, calculating means, controlling signal generating means and watchdog signal generating means, said storage means being adapted to store the vehicle actual speed signal generated by said speed sensor as a stored speed signal in response to operation of the setting switch of said command switch, said calculating means being connected to said storage means and to said controlling signal generating means and being adapted to compare said vehicle actual speed signal with the stored speed signal stored in the storage means for generating a differential signal corresponding to a difference between the stored speed signal and the vehicle actual speed signal, said controlling signal generating means being provided with a vehicle speed increasing signal generating means and a vehicle speed decreasing signal generating means for supplying vehicle speed increasing and decreasing signals to said actuator driving circuit, and said watchdog signal generating means being adapted to generate a watchdog pulse signal with a predetermined period during normal fault free operation of the microcomputer; and watchdog signal judgement means, connected with said microcomputer and said actuator driving circuits, adapted to monitor the watchdog pulse signal, said watchdog signal judgement means being adapted to prevent the operation of said actuator driving circuit in the event of an abnormality in the predetermined period of the watchdog pulse signal, wherein the improvement comprises;

said watchdog signal generating means of said microcomputer including monitoring means for monitoring the vehicle actual speed signal, said monitoring means being adapted to inhibit the generation of the watchdog signal when the value of the vehicle actual speed signal is lower than a predetermined lower limiting value.

3. A constant-speed cruising controlling system for a vehicle having a throttle valve for controlling a speed thereof comprising:

a speed sensor for sensing an actual running speed of the vehicle and for generating a vehicle actual speed signal proportional to the actual running speed of the vehicle;

a command switch including a setting switch operable for generating a cruise command setting signal;

an actuator for driving the throttle valve of the vehicle;

an actuator driving circuit for driving said actuator;

a microcomputer connected with said speed sensor, said command switch and said actuator driving circuit, and having storage means, calculating means, controlling signal generating means and watchdog signal generating means, said storage means being adapted to store the vehicle actual speed signal generated by said speed sensor as a stored speed signal in response to operation of the setting switch of said command switch, said calculating means being connected to said storage means and to said controlling signal generating means and being adapted to compare said vehicle actual speed signal with the stored speed signal stored in the storage means for generating a differential signal corresponding to a difference between the stored speed signal and the vehicle actual speed signal, said controlling signal generating means being provided with a vehicle speed increasing signal generating means and a vehicle speed decreasing signal generating means for supplying vehicle speed increasing and decreasing signals to said actuator driving circuit, and said watchdog signal generating means being adapted to generate a watchdog pulse signal with a predetermined period during normal fault free operation of the microcomputer; and watchdog signal judgement means connected with said microcomputer and said actuator driving circuit, adapted to monitor the watchdog pulse signal, said watchdog signal judgement means being adapted to prevent the operation of said actuator driving circuit in the event of an abnormality in the predetermined period of the watchdog pulse signal, wherein the improvement comprises;

said watchdog signal generating means of said microcomputer including first monitoring means for monitoring the vehicle actual speed signal, said monitoring means being adapted to inhibit the generation of the watchdog pulse signal when the value of the vehicle actual speed signal is higher than a predetermined upper limiting value.

4. A constant-speed cruising controlling system for a vehicle having a throttle valve for controlling a speed thereof comprising:

a speed sensor for sensing an actual running speed of the vehicle and for generating a vehicle actual speed signal proportional to the actual running speed of the vehicle;

a command switch including a setting switch operable for generating a cruise command setting signal;

an actuator for driving the throttle valve of the vehicle;

an actuator driving circuit for driving said actuator;

a microcomputer connected with said speed sensor, said command switch and said actuator driving circuit, and having storage means, calculating means, controlling signal generating means and watchdog signal generating means, said storage means being adapted to store the vehicle actual speed signal generated by said speed sensor as a stored speed signal in response to operation of the setting switch of said command switch, said calculating means being connected to said storage means and to said controlling signal generating means and being adapted to compare said vehicle actual speed signal with the stored speed signal stored in the storage means for generating a differential signal corresponding to a difference between the signal, said controlling signal generating means being provided with a vehicle speed increasing signal generating means and a vehicle speed decreasing signal generating means for supplying vehicle speed increasing and decreasing signals to said actuator driving circuit, and said watchdog signal generating means being adapted to generate a watchdog pulse signal with a predetermined period during normal fault free operation of the microcomputer; and watchdog signal judgement means connected with said microcomputer and said actuator driving circuit, adapted to monitor the watchdog signal, said watchdog signal judgement means being adapted to prevent the operation of said actuator driving circuit in the event of an abnormality in the predetermined period of the watchdog pulse signal, wherein the improvement comprises;

said watchdog signal generating means of said microcomputer including monitoring means for monitoring the vehicle actual speed signal said monitoring means being adapted to inhibit the generation of the watchdog pulse signal when the value of the vehicle actual speed signal is lower than a predetermined lower limiting value or higher than a predetermined upper limiting value.

\* \* \* \* \*